US010049430B2

(12) United States Patent
Bostick et al.

(10) Patent No.: US 10,049,430 B2
(45) Date of Patent: Aug. 14, 2018

(54) VISUAL EFFECT AUGMENTATION OF PHOTOGRAPHIC IMAGES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/262,073

(22) Filed: Sep. 12, 2016

(65) Prior Publication Data
US 2018/0075575 A1    Mar. 15, 2018

(51) Int. Cl.
*G09G 5/00* (2006.01)
*G06T 3/00* (2006.01)
*G06K 9/00* (2006.01)

(52) U.S. Cl.
CPC ........ *G06T 3/0056* (2013.01); *G06K 9/00671* (2013.01); *G06K 9/00892* (2013.01); *G06K 2009/00939* (2013.01); *G06T 2210/61* (2013.01)

(58) Field of Classification Search
CPC .......................... G06T 3/0056; G06K 9/00671
USPC .................................................. 345/629–641
See application file for complete search history.

(56) References Cited

U.S. PATENT DOCUMENTS 7,590,259 B2   9/2009 Levy et al.
9,092,674 B2   7/2015 Andrade et al.
2006/0179453 A1   8/2006 Kadie et al.
2011/0098056 A1*  4/2011 Rhoads ................. G01C 21/20
                                                                455/456.1
2013/0044128 A1   2/2013 Liu et al.
2014/0121017 A1*  5/2014 Mandryk ................ A63F 13/06
                                                                463/36

(Continued)

FOREIGN PATENT DOCUMENTS

WO    2009075754 A1    6/2009
WO    2014167383 A1   10/2014

OTHER PUBLICATIONS

P. Mell et al., "The Nist Definition of Cloud Computing", National Institute of Standards and Technology, Information Technology Laboratory, Sep. 2011, pp. 1-7.

(Continued)

*Primary Examiner* — Ryan R Yang
(74) *Attorney, Agent, or Firm* — Law Office of Jim Boice

(57) ABSTRACT

A method, system, and/or computer program product augment and display a photographic image based on a context of a subject of the photographic image. One or more processors receive a photographic image that was captured by a camera. The processor(s) determine a context of the photographic image, where the context is captured by a context sensor at a location of a subject whose image is captured in the photographic image, and where the context describes a state of the subject whose image is captured in the photographic image. The processor(s) augment the photographic image with an additional feature to create an augmented photographic image based on the context captured by the context sensor. The processor(s) then display the augmented photographic image on a viewing device.

20 Claims, 5 Drawing Sheets

(56) References Cited

U.S. PATENT DOCUMENTS

2014/0306987 A1    10/2014  Snibbe et al.
2017/0228596 A1*   8/2017   Wexler ............... G06K 9/00671

OTHER PUBLICATIONS

Anonymous, Method and System for Augmeted Information Display in Social Network Photograph, ip.com, Dec. 18, 2014, IPCOM000239976D.

Anonymous, "Propagating Audio From Video to Photos", ip.com, Nov. 19, 2007, IPCOM000160525D.

* cited by examiner

VISUAL EFFECT AUGMENTATION OF PHOTOGRAPHIC IMAGES

BACKGROUND

The present disclosure relates to the field of photography, and particularly to hardware devices that capture and manipulate photographic images. Still more particularly, the present disclosure relates to hardware devices that manipulate photographic images according to a context of the photographic images.

SUMMARY

In one or more embodiments of the present invention, a method, system, and/or computer program product augment and display a photographic image based on a context of a subject of the photographic image. One or more processors receive a photographic image that was captured by a camera. The processor(s) determine a context of the photographic image, where the context is captured by a context sensor at a location of a subject whose image is captured in the photographic image, and where the context describes a state of the subject whose image is captured in the photographic image. The processor(s) augment the photographic image with an additional feature to create an augmented photographic image based on the context captured by the context sensor. The processor(s) then display the augmented photographic image on a viewing device.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
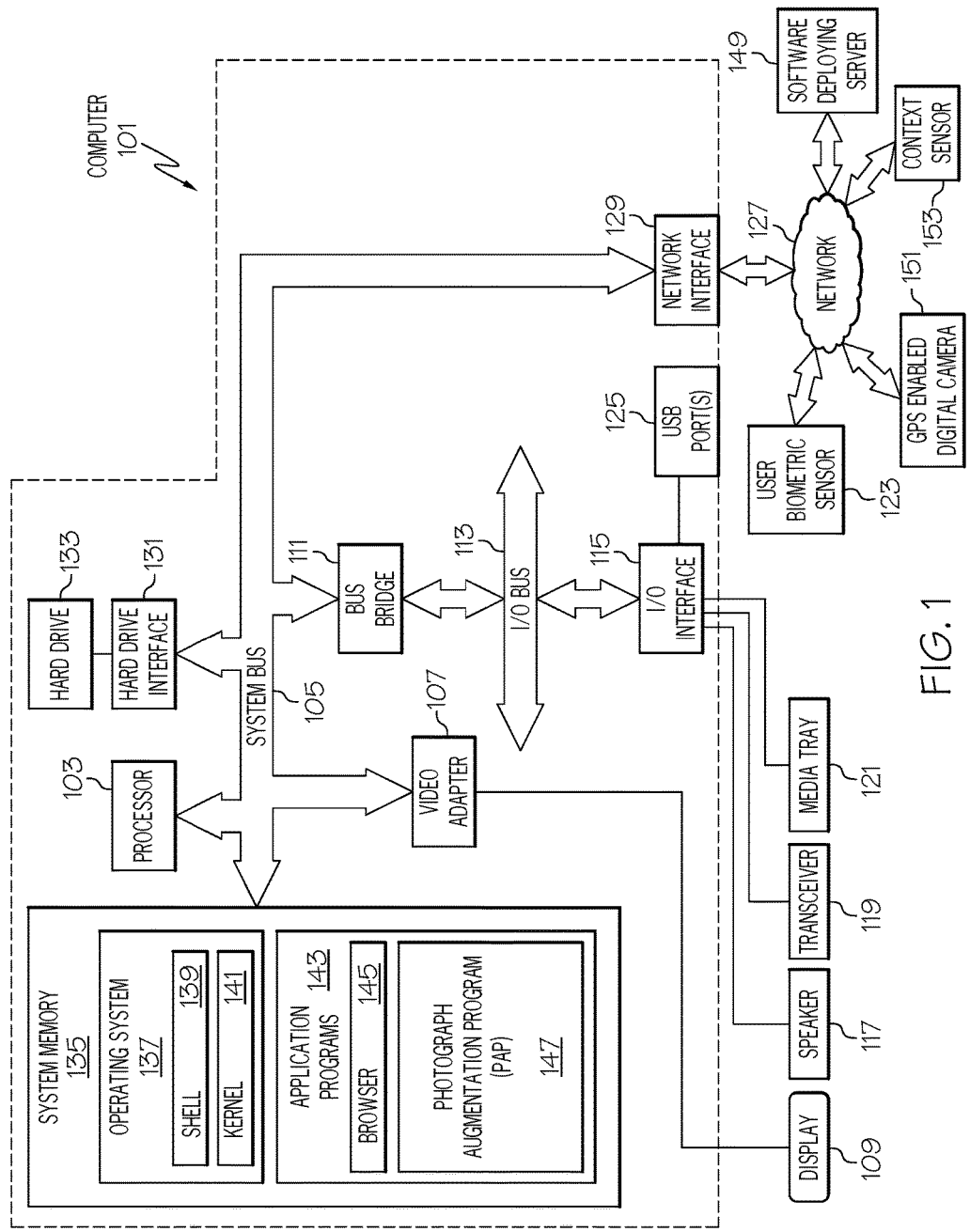
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, the present invention provides a contextual analysis of images for audio and/or visual effect augmentation for photo viewing. Presented herein is a method of contextual analysis of image captured metadata (e.g., location, date, time tags appended to a photograph by a camera), extracted metadata about the image objects and people (e.g., sensor data that describes a state of a subject whose image is captured by the photograph), and/or user biometrics data that describes a mood and sentiment of a user who is viewing the photograph. This captured metadata, extracted metadata, and/or user biometrics data is used as inputs in real time to obtain and display augmented audio and video effects with the photographic image for a more rich experience.

When photographs are taken, the camera may inscribe onto the captured image file metadata such as where and when the photograph was taken. However, there are many attributes of the environment that are not captured in the metadata that, if available, could provide a perspective of the subject being photographed.

Examples of such metadata that is not captured by the camera in the prior art include, but are not limited to weather conditions, ambient sounds, objects near the subject of the photograph, and/or biometric readings for the subject of the photograph.

Weather conditions for when the photograph was taken may include being windy, rainy, misty, cold, hot, dusty, snowy, and/or sunny.

Wind has both physiological effect and a physical effect. For example, wind may cause the physiological effect on a subject of a photograph by making their skin cool/cold (physiological effect), while wind may also cause inanimate objects to move (e.g., may cause a flag to wave, clouds to move, wind to howl, waves to feather, rain to blow, etc.).

Rain not only produces a visual image, but also a sound as it hits the ground or other physical structures (e.g., roves). As with wind, rain can also induce a physiological effect on a person being photographed by making that person chilled when the rain hits his/her skin. Mist may have a similar effect as rain, but to a lesser degree.

Cold temperatures may cause a person being photographed to experience a chill (physiological effect), or may freeze water (physical effect). Similarly, hot temperatures may cause a person to feel flushed (physiological effect) or material to expand, perhaps creating a popping sound while expanding (physical effect).

Dust may obscure an image of a subject being photographed, and is often associated with sounds such as wind.

Snow may obscure an image of a subject being photographed and/or otherwise affect the physical appearance of the subject (e.g., show-capped trees), but can also affect the physiological state of a person being photographed (just as cold temperature does). However, snow in a photograph may invoke different feelings to a viewer of the photograph. That is, snow on a ski slope in January is often viewed with pleasure, while a photograph of snow falling in May after a long winter is often viewed with displeasure.

Sunny weather can make people feel happy in certain contexts (e.g. a picture of a beach), but in other contexts (e.g., a photograph of a desert) may be unpleasant.

Besides weather related context, other contexts may be based on activities of persons who may or may not be in the photograph. For example, at a sporting event, the sounds of an announcer calling a game, players talking on the field, players colliding with one another while playing a contact sport, fans cheering, etc. may invoke the feeling of excitement (pleasant) or fear (unpleasant).

Similarly, the sounds produced by other activities (e.g., cars racing, skis carving up an icy slope, water skis hitting a wake, etc.) may be pleasant or unpleasant, depending on the state of a particular person.

Activity biometrics can also affect whether an activity is pleasant or not. For example, when breathing hard during a run, hike or intense activity, such increased respiratory rate may be pleasant to one accustomed to such activities, but may be unpleasant to one who is not used to such exertion.

Now consider when a user is capturing photos or videos (which may be grouped in an album). From the album of all photos taken, a select set may be published on social media for people to see. The raw photos or album is a more complete set of all the things the person has seen, and can provide insight on data points of metadata that can be associated with photos and/or used to retrieve in real time additional metadata.

Thus, the present invention provides a method that allows external audio/visual metadata to be associated with photographs based on the context of the photograph and/or the state of the user viewing the photographs.

Thus, one or more embodiments of the present invention provide a method for contextual analysis of image captured metadata (location, date, time) and metadata extracted about the image objects and people to use as input in real time to obtain and display augmented audio and video effects with the image.

As described herein and in one or more embodiments, the present invention provides a method by which: 1) Image data is extracted from image metadata (i.e., location, date, time), co-located information about other photos in album, or objects extracted from images; 2) A remote cognitive system performs contextual analysis of the gathered image data to determine extended or surrounding information (weather, events, mood and sentiment, smell); 3) Images are augmented in real time with associated audio and visual effects; and/or 4) Based on the user's preferences while selecting a photo as part of an album or standalone, software will display the image with augmented audio and visual effects.

The present invention utilizes 1) a digital camera device; 2) a computer with the capability to capture metadata for location, date, and time; 3) an (optional) wearable device (e.g., a smart watch) to control biometric sensors on the viewer and/or subject of a photograph; 4) sensors to capture biometric data such as heart rate and pulse to determine a user's current mood while viewing photos; and/or 5) wearable biometrics data that is streamed in real time to a social media site and available to the cognitive system to use while the user is viewing photos to help determine mood.

A cognitive system used to evaluate the photograph and how it should be augmented may extract metadata about objects and people in the photograph, perform a contextual analysis on the imaged objects to determine surrounding information, and then augment the image with audio and/or visual effects in real time. The augmented photographs can then be presented to a social media website for viewing.

In an embodiment of the present invention, metadata about image capture settings (e.g., from the camera) capture information such as the date, time, and place that the photograph was taken by the camera, which may be on a smart phone, a digital camera, etc.

A profile of the subject of the photograph and/or a viewer of the photograph can then define specific attributes of audio or visual effects to be applied to the photograph.

1. System Initialization

The camera is initialized to set the global positioning system (GPS) setting of the camera, such that the system can determine where the camera is located when capturing a photographic image.

Biometric sensors may also be initialized. That is, biometric sensor readings may be taken from the subject of the photograph and/or the viewer of the photograph. In one or more embodiments, biometric sensors for the subject and/or viewer are calibrated for a particular person, in order to obtain meaningful data. For example, some people have very low blood pressure (e.g., 100/60) and others normally have high blood pressure (150/90). Thus, the biometric sensor will establish a baseline for the user in order to determine the appropriate correlation of the biometric reading with the mood of the person. For example, if a person's normal blood pressure is 120/80 with a pulse of 60, and it jumps to 160/100 and pulse 100, there is an indication of a change in mood due to increased stress level.

2. Image Data Extraction

Image capture metadata: When a photo image is captured, the camera (e.g., a digital camera, part of a smart phone, etc.) captures the location, date, time when the photograph is taken, and then stores this information as metadata on the digital image file for the captured image.

Co-located time frame meta data: Information from co-located and similar time frame captured photographs may also be extracted. For example, a series of photos in an album or folder captured over period of a day or during a trip can provide a context of a particular photo. For example, consider a photograph of a fire. If other images from the album from which the photograph was taken show images of a forest fire, then the image will have a context of being unpleasant. As such, an appropriate augmentation of that image will be harsh (e.g., color coded red to indicate an emergency, a sound track of disturbing music that indicates a problematic condition, etc.). However, if the other photographs from the album show people around a campfire on a beach, then the image of the fire (from the campfire) will be deemed to have a pleasant context. As such, the image in this context will be augmented with a cheerful border, a cheery soundtrack, etc.

Extracted meta data: The photo digital image often contains information that can be extracted from the image, which can then be used to derive additional information. Through use of image analytics, the image objects and people can be extracted, searched and identified. This could also include visual cues (e.g., an impression of wind, such as hair flying, etc.).

The cognitive system will evaluate the image metadata obtained and extracted to use as input for contextual analysis.

3. Contextual Analysis of Image Data and Surrounding

A remote cognitive system may perform a contextual analysis of the gathered image data to determine extended or surrounding information about the images, either standalone or as part of an album.

The cognitive system may evaluate the viewer's preference for the type of attributes to apply to the photograph(s).

4. Augment Image in Real Time with Enhanced Audio and Visual Effects

While navigating a photograph, the present invention may augment the photograph with an appropriate audio and/or visual effect.

For example, if the photograph (or video) shows an image of a windy condition when the photograph was taken (or sensors on site while the photograph was being taken captured data indicative of such windy conditions), then a photograph of a flying leaf may be augmented with the sound effect of wind, or the photograph may be moved back and forth to indicate wind-induced movement of the leaf.

If the photograph (or video) is that of a hockey game, then the photograph/video may be augmented with the sound of players colliding.

If the photograph (or video) is that of a person driving a vehicle (e.g., a race car driver), then the photograph and/or video may be augmented by a jerking effect on the screen, with or without an appropriate soundtrack of a racecar.

If the photograph is that of a subject having a pleasant or unpleasant smell (e.g., flowers, garbage, food, etc.), certain symbols descriptive of such smells may be applied/overlaid onto a background of the photograph.

The sounds and/or visual effects to be applied to the photograph may be retrieved from a database of sounds and visual effects for the identified image, based on their association with the given context of the subject of the photograph and the state of the viewer of the photograph.

5. Viewing the Photos with Enhanced Audio and Visual Effects Based on the Contextual Analysis Once the photograph is appropriately augmented as described above, the augmented photograph will be displayed to a person/viewer, optionally based on the current cognitive state of that person/viewer.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a speaker 117 (capable of reproducing human and/or environmental sounds), a transceiver 119 (capable of directly transmitting and receiving wireless signals to transceivers in other devices, such as a global positioning system (GPS) enabled camera 151), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., GPS enabled digital camera 151, context sensor 153, user biometric sensor 123, etc.) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

In an embodiment, computer 101 is able to communicate with a user biometric sensor 123 via network 127. Various embodiments of user biometric sensor 123 detect various biometric states of a user to whom the user biometric sensor 123 is attached and/or directed. For example, user biometric sensor 123 may be a heart monitor that measures the heart rhythm (e.g., generates an electrocardiogram, detects beats per minute, etc.) of the user. User biometric sensor 123 may be a blood pressure cuff. User biometric sensor 123 may be a galvanometer/ohmmeter that measures changes in skin resistance caused by a user sweating. User biometric sensor 123 may be a thermometer that measures a body and/or skin temperature of a user. User biometric sensor 123 may detect a respiratory rate (e.g., breaths taken per minute) of the user. Such biometric sensor readings are then used by computer 101 to determine the current physiological and/or emotional state of the user. That is, an increase in heart rate, blood pressure, skin temperature, etc., may indicate that the user is anxious.

In an embodiment, computer 101 is able to communicate via network 127 with a GPS enabled digital camera 151, which captures and transmits still and/or moving digital images to computer 101.

In an embodiment, computer 101 is able to communicate via network 127 with a context sensor 153. Context sensor 153 may be a biometric sensor (analogous to user biometric sensor 123) that captures a physiological state of a person in a photograph, or context sensor 153 may capture an environmental (i.e., physical) state of a subject (e.g., a landscape) in a photograph.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Photograph Augmentation Program (PAP) 147. PAP 147 includes code for implementing the processes described below, including those described in FIGS. 2-3. In one embodiment, computer 101 is able to download PAP 147 from software deploying server 149, including in an on-demand basis, wherein the code in PAP 147 is not downloaded until needed for execution. In one embodiment of the present invention, software deploying server 149 performs all of the functions associated with the present invention (including execution of PAP 147), thus freeing computer 101 from having to use its own internal computing resources to execute PAP 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
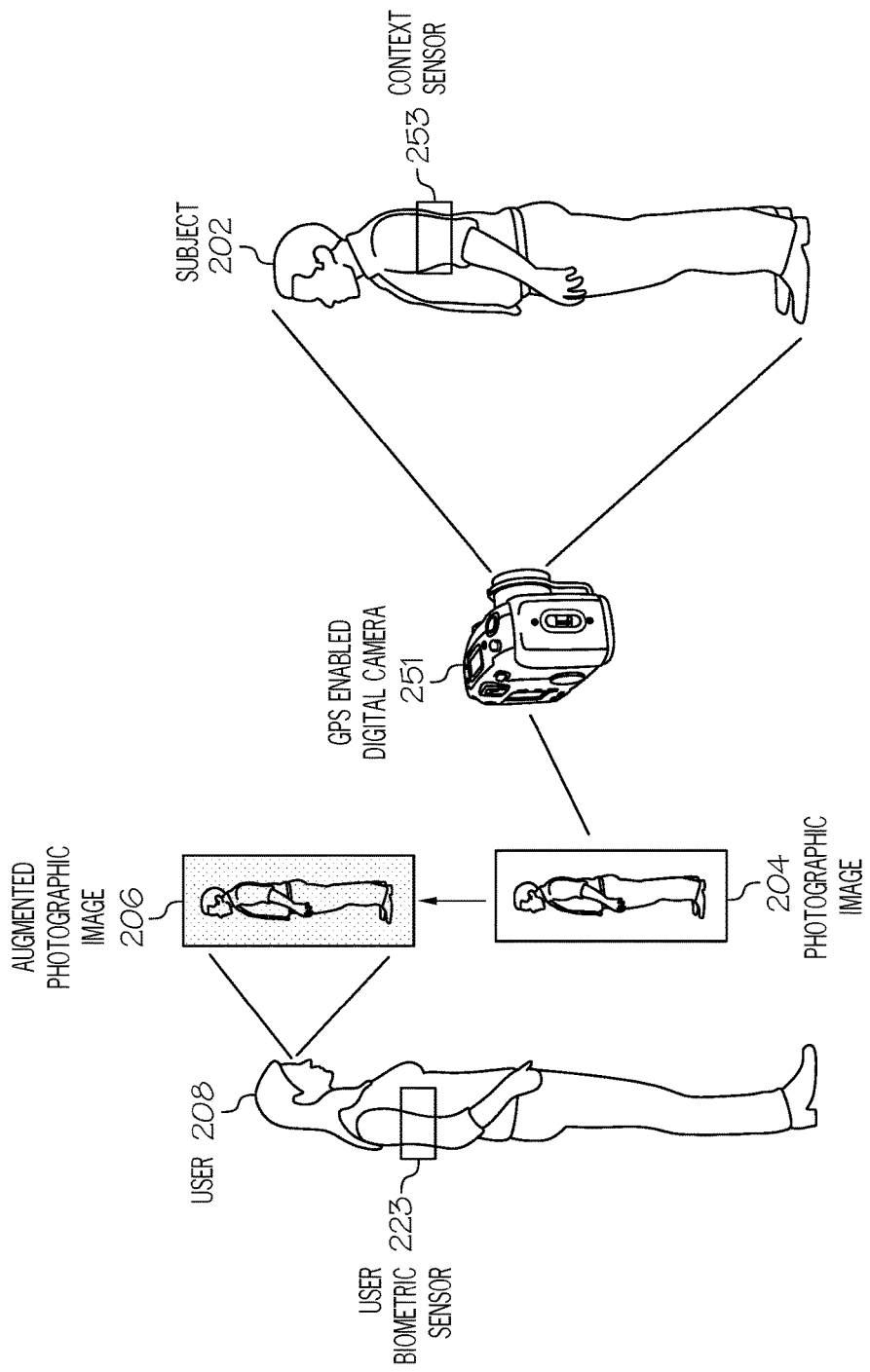
FIG. 2 illustrates a photographic image being augmented according to one or more embodiments of the present invention.

With referenced now to FIG. 2, a GPS enabled digital camera 251 (analogous to GPS enabled digital camera 151 shown in FIG. 1) is depicted capturing a photographic image 204 of a subject 202.

Assume that the subject 202 is a person, as shown in FIG. 2. As such, a context sensor 253 (analogous to the context sensor 153 shown in FIG. 1) may be capturing the current state of that person (e.g., being happy, anxious, cold, hot, etc.) and/or the environmental state around the person (e.g., hot, cold, rainy, snowy, etc.). The GPS enabled digital camera 251 will not only apply to the photographic image 204 (using internal logic such as a clock, calendar, GPS system) metadata describing the time, date, and location at which the photographic image 204 was captured, but will also apply metadata to the photographic image 204 from sensor readings captured from context sensor 253 describing the state of the person and/or the person's environment. It is to be understood that the photographic image 204 represents not only the visual photograph itself, but also the digital image file created by the GPS enabled digital camera 251 when capturing an image of subject 202.

For example, assume that when GPS enabled digital camera 251 captured photographic image 204 of subject 202 (a person), the person was standing in a snow bank. As such, the GPS enabled digital camera 251 will apply metadata to a digital video file that not only describes the date, time and place at which the photographic image 204 was taken (using internal logic within the GPS enabled digital camera 251), but will also apply metadata to that same digital video file from the context sensor 253 describing the physiological state of the person/subject 202 (e.g., cold, shivering, wet, etc.) and/or the physical state of the environment (e.g., rainy, snowy, dark, etc.) around the person/subject 202 at the time the photographic image 204 was taken by the GPS enabled digital camera 251.

Assume that that subject 202 is actually a non-biological subject, such as a landscape, a campfire, a building, etc. (not depicted in FIG. 2). As such, a context sensor 253 may be capturing the current state of the non-biological subject, such as being rainy, snowy, cold, hot, etc. The GPS enabled digital camera 251 will not only apply to the photographic image 204 (using internal logic such as a clock, calendar, GPS system) metadata describing the time, date, and location at which the photographic image 204 was captured, but will also apply metadata to the photographic image 204 from sensor readings captured from context sensor 253 describing the state of the non-biological subject, such as the weather conditions, darkness, etc. Thus, the GPS enabled digital camera 251 will apply the metadata describing the time, date, and location at which the photographic image 204 was captured (using readings from logic internal to the GPS enabled digital camera 251) as well as metadata from the context sensor 253 (e.g., describing lighting conditions, weather, etc.) to the digital image file for the photographic image 204.

A system (e.g., computer 101 shown in FIG. 1) will then process the photographic image 204 based on the metadata produced by the GPS enabled digital camera 251 as well as metadata based on sensors readings (e.g., from context sensor 253) to generate an augmented photographic image 206.

As shown in FIG. 2, the augmented photographic image 206 may be visually adjusted. For example, if the person/subject 202 was cold (as described by metadata applied to the digital image file based on readings from context sensor 253) when the photographic image 204 was captured by the GPS enabled digital camera 251, then computer 101 may overlay a dark shading over the photographic image 204, thus invoking the feeling of coldness.

The photographic image 204 may also be augmented with sound. For example, assume that the person/subject 202 was standing in a snow storm when photographic image 204 was captured. Context sensor 253, which may include a microphone, may send an audio file to the computer 101, where the audio file captures the sound of howling wind. When the computer 101 displays the augmented photographic image 206 (with or without the depicted shading shown in FIG. 2), a speaker 117 on the computer 101 will play the audio file, such that the photograph is presented along with the sound of the howling wind.

As shown in FIG. 2, a user 208 is viewing the augmented photographic image 206. In an embodiment of the present invention, how the photographic image 204 is augmented depends in whole or part on a state of the user 208. For example, assume that a user biometric sensor 223 (analogous to the user biometric sensor 123 shown in FIG. 1) detects that the user is feeling strong (e.g., is alert). As such, the computer 101 will augment the photographic image with bright images and/or borders and/or shading, and/or will augment the photographic image with high energy music that the user 208 will appreciate while viewing the augmented photographic image 206. However, if user biometric sensor 223 detects that the user is feeling weak (e.g., is tired), then computer 101 will augment the photographic image with muted images and/or borders and/or shading, and/or will augment the photographic image with slower relaxing music.

Figure 3:
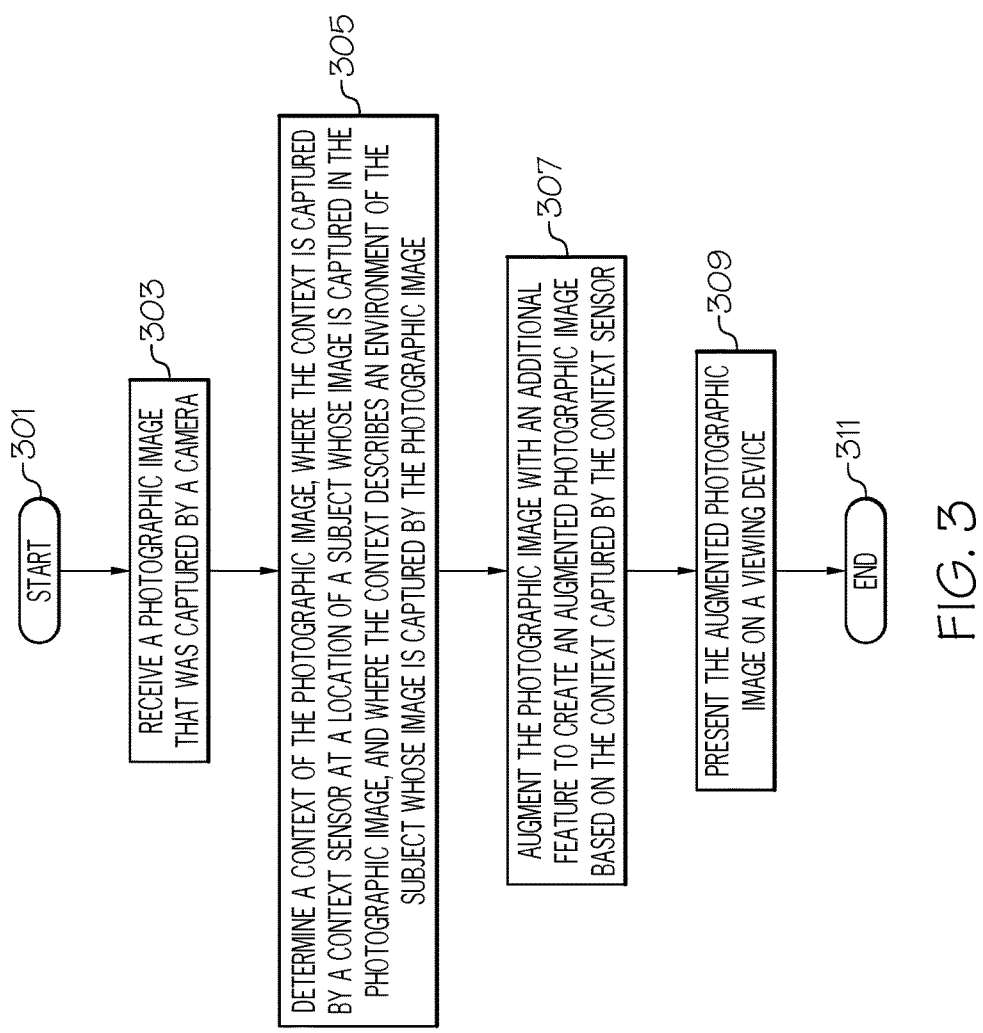
FIG. 3 is a high level flow chart of one or more steps performed by one or more processors and/or other hardware devices to augment a photographic image based on a context captured by a context sensor at a location of a subject whose image is captured by the photographic image.

With reference now to FIG. 3, a high level flow chart of one or more steps performed by one or more processors and/or other hardware devices to augment a photographic image based on a context captured by a context sensor at a location of a subject whose image is captured by the photographic image is presented.

After initiator block 301, one or more processors (e.g., processor 103 shown in FIG. 1) receive a photographic image (e.g., photographic image 204 shown in FIG. 2) that was captured by a camera (e.g., GPS enabled digital camera 251), as described in block 303.

As described in block 305, the processor(s) determine a context of the photographic image. As described herein, the context is captured by a context sensor (e.g., context sensor 253 shown in FIG. 2) at a location of a subject (e.g., a building, landscape, person, etc.) whose image is captured in the photographic image. The context describes a state (i.e., a physiological state for a person or a physical state for a person or an inanimate object such as a landscape) of the subject whose image is captured in the photographic image.

As described in block 307, the processor(s) augment the photographic image with an additional feature (visual or aural) to create an augmented photographic image (e.g., augmented photographic image 206 shown in FIG. 2) based on the context captured by the context sensor.

As described in block 309, the processor(s) then display the augmented photographic image on a viewing device (e.g., the display 109 shown in FIG. 1 with or without use of the speaker 117).

The flow chart ends at terminator block 311.

In an embodiment of the present invention, the context is a physiological state of a person whose image is captured in the photographic image, where the physiological state of the person is detected by a biometric sensor (e.g., context sensor 253 shown in FIG. 2 when operating as a biometric sensor) associated with the person. In an exemplary application of this embodiment, augmenting the photographic image is achieved by the processor(s) adding a sound track to the photographic image, where the sound track evokes the physiological state of the person captured in the photographic image. That is, the sound track may be of howling wind, crackling fire, etc. that are associated with the physiological state (hot, cold, wet, etc.) of the person in the photograph.

In an embodiment of the present invention, the sound track is captured by the camera while capturing the photographic image. Thus, the sound track is the same as what the person in the photograph is hearing when the photograph was taken. In another embodiment, however, the sound track is retrieved from a database of stored sound tracks that were not captured by the camera. That is, the sound track is retrieved from a database of audio files that each have attached metadata describing their sounds. The computer then matches the metadata from the digital video file generated by the camera (e.g., describing windy conditions) to metadata on the stored audio file (for the sound of wind) in order to provide the appropriate sound track to the photograph (or video).

In an embodiment of the present invention, the context of the photographic image is a physiological state of a person whose image is captured in the photographic image, and where the physiological state of the person is detected by a user biometric sensor associated with the person. In such an embodiment, the processor(s) may overlay a visual effect (e.g., shading, coloring, emojis, etc.) on the photographic image, such that the visual effect evokes the physiological state of the person whose image is captured in the photographic image.

In an embodiment of the present invention, the context is a temperature of a landscape whose image is captured in the photographic image, wherein the temperature is captured by a thermometer associated with the landscape. In such an embodiment, augmenting the photographic image is achieved by the processor(s) overlaying a visual effect on the photographic image, where the visual effect evokes the temperature of the landscape whose image is captured in the photographic image. For example, if a thermometer on the camera provides the camera with metadata describing cold conditions to be applied to the digital image file, then a blue (suggestive of cold) overlay may be applied to the photograph.

As described herein, the state of the viewer may affect in whole or in part the appearance of the augmented photographic image. That is, as described herein one or more processors (e.g., from computer 101) may receive biometric sensor readings from a biometric sensor (e.g., user biometric sensor 223 shown in FIG. 2) associated with (e.g., worn by) a viewer (e.g., user 208 shown in FIG. 2) of the photographic image. In such an embodiment, augmenting the photographic image can be accomplished by the processor(s) augmenting (or further augmenting) the photographic image according to the biometric sensor readings for the viewer. Thus, if the user 208 is feeling tired, then the augmented photographic image 206 may be displayed on computer 101 with a soothing quiet soundtrack or may be filtered to be shaded, thus providing a calmer viewing experience.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
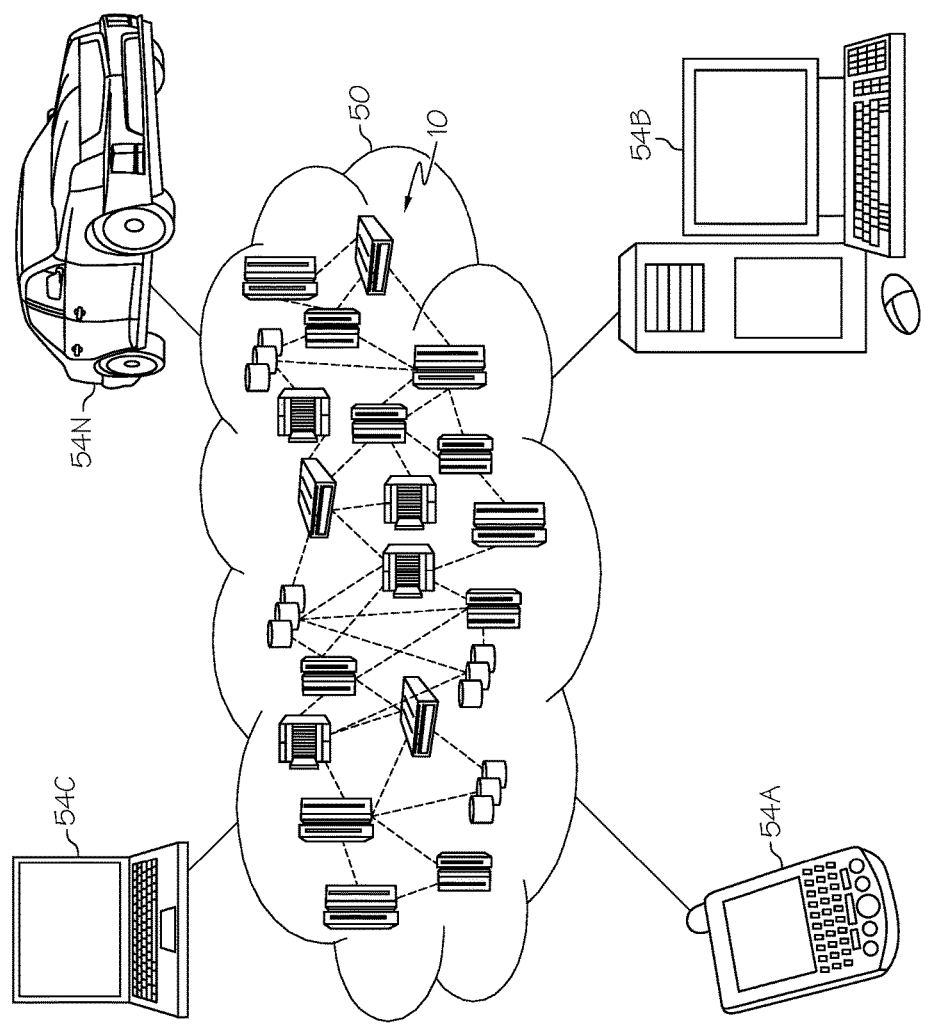
FIG. 4 depicts a cloud computing environment according to an embodiment of the present invention.

Referring now to FIG. 4, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
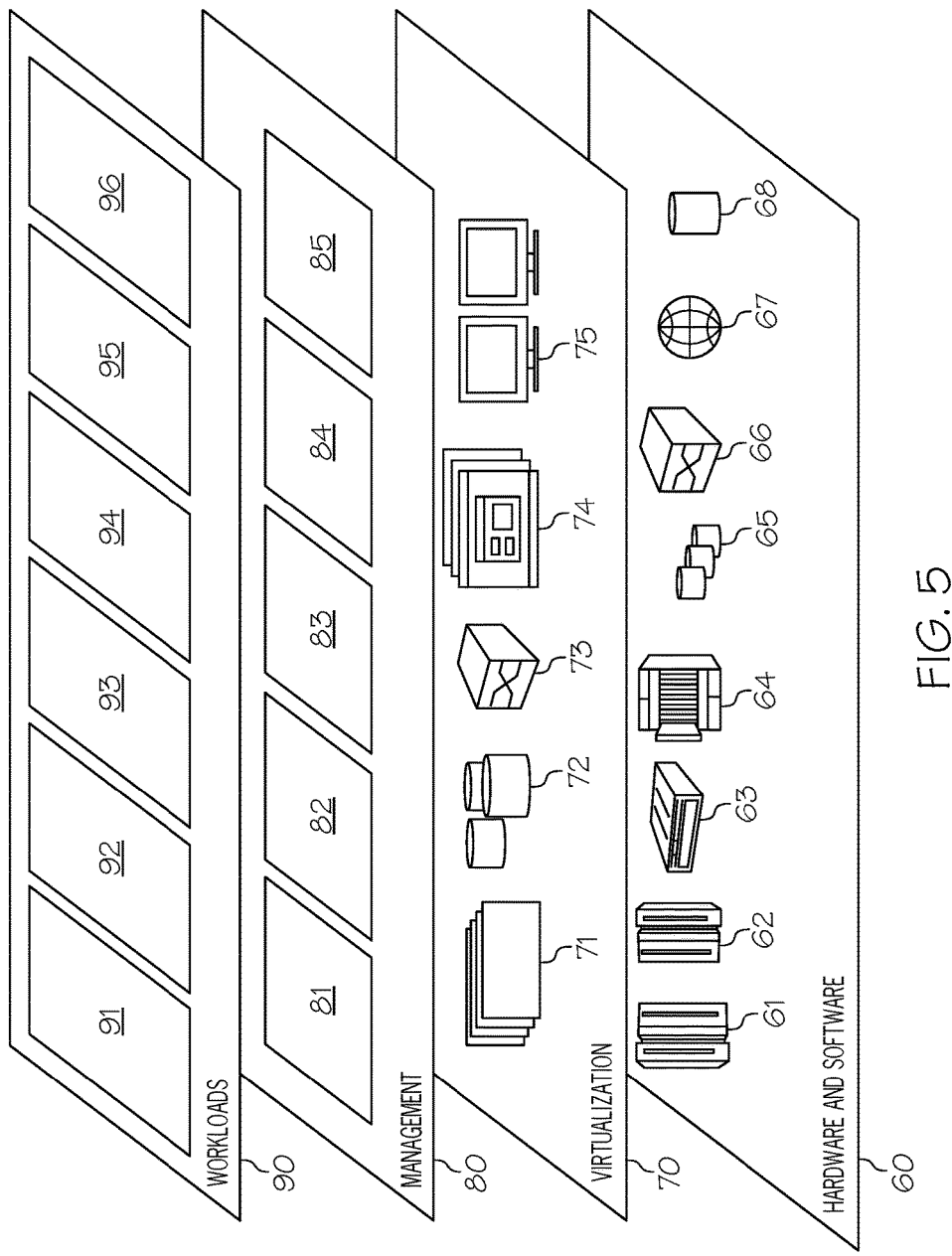
FIG. 5 depicts abstraction model layers of a cloud computing environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and photograph manipulation processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
receiving, by one or more processors, a photographic image that was captured by a camera;
determining, by one or more processors, a context of the photographic image, wherein the context is captured by a context sensor at a location of a subject whose image is captured in the photographic image, wherein the context describes a state of the subject whose image is captured in the photographic image, wherein the photographic image is from an album of photographs, and wherein the context of the photograph image is determined by:
determining, by one or more processors, the context of the photographic image based on images shown in one or more other photographs from the album of photographs;
augmenting, by one or more processors, the photographic image with an additional feature to create an augmented photographic image based on the context captured by the context sensor; and
displaying, by one or more processors, the augmented photographic image on a viewing device.

2. The method of claim 1, wherein the context is a physiological state of a person whose image is captured in the photographic image, wherein the physiological state of the person is detected by a biometric sensor associated with the person, and wherein said augmenting the photographic image comprises:
adding, by one or more processors, a sound track to the photographic image, wherein the sound track evokes the physiological state of the person captured in the photographic image.

3. The method of claim 2, wherein the sound track is captured by the camera while capturing the photographic image.

4. The method of claim 2, wherein the sound track is retrieved from a database of stored sound tracks that were not captured by the camera.

5. The method of claim 1, wherein the context is a physiological state of a person whose image is captured in the photographic image, wherein the physiological state of the person is detected by a user biometric sensor associated with the person, and wherein said augmenting the photographic image comprises:
overlaying, by one or more processors, a visual effect on the photographic image, wherein the visual effect evokes the physiological state of the person whose image is captured in the photographic image.

6. The method of claim 1, wherein the context is a temperature of a landscape whose image is captured in the photographic image, wherein the temperature is captured by a thermometer associated with the landscape, and wherein said augmenting the photographic image comprises:
overlaying, by one or more processors, a visual effect on the photographic image, wherein the visual effect evokes the temperature of the landscape whose image is captured in the photographic image.

7. The method of claim 1, wherein one or more processors receive biometric sensor readings from a biometric sensor associated with a viewer of the photographic image, and wherein said augmenting the photographic image comprises:
augmenting, by one or more processors, the photographic image according to the biometric sensor readings for the viewer, wherein the photographic image is augmented with images that describe an emotional state of the viewer that is caused by the viewer viewing the photographic image.

8. The method of claim 1, wherein one or more processors receive biometric sensor readings from a biometric sensor associated with a viewer of the photographic image, wherein the photographic image is of an other person than the viewer, and wherein said augmenting the photographic image comprises:
augmenting, by one or more processors, the photographic image according to the biometric sensor readings for the viewer, wherein the photographic image is augmented with muted shading and slow relaxing music that describe a weak feeling of the viewer, and wherein the weak feeling of the viewer is detected by the biometric sensor while the viewer is viewing the photographic image of the other person.

9. A computer program product comprising one or more computer readable storage mediums, and program instructions stored on at least one of the one or more storage mediums, the stored program instructions comprising:
program instructions to receive a photographic image that was captured by a camera;
program instructions to determine a context of the photographic image, wherein the context is captured by a context sensor at a location of a subject whose image is captured in the photographic image, wherein the context describes a state of the subject whose image is captured in the photographic image, wherein the photographic image is from an album of photographs, and wherein the context of the photograph image is determined by:
determining the context of the photographic image based on images shown in one or more other photographs from the album of photographs;
program instructions to augment the photographic image with an additional feature to create an augmented photographic image based on the context captured by the context sensor; and
program instructions to present the augmented photographic image on a viewing device.

10. The computer program product of claim 9, wherein the context is a physiological state of a person whose image is captured in the photographic image, wherein the physiological state of the person is detected by a biometric sensor associated with the person, and wherein said program instructions to augment the photographic image comprise:
program instructions to add a sound track to the photographic image, wherein the sound track evokes the physiological state of the person captured in the photographic image.

11. The computer program product of claim 10, wherein the sound track is captured by the camera while capturing the photographic image.

12. The computer program product of claim 10, wherein the sound track is retrieved from a database of stored sound tracks that were not captured by the camera.

13. The computer program product of claim 9, wherein the context is a physiological state of a person whose image is captured in the photographic image, wherein the physiological state of the person is detected by a user biometric sensor associated with the person, and wherein said program instructions to augment the photographic image comprise:
   program instructions to overlay a visual effect on the photographic image, wherein the visual effect evokes the physiological state of the person whose image is captured in the photographic image.

14. The computer program product of claim 9, wherein the context is a temperature of a landscape whose image is captured in the photographic image, wherein the temperature is captured by a thermometer associated with the landscape, and wherein said program instructions to augment the photographic image comprise:
   program instructions to overlay a visual effect on the photographic image, wherein the visual effect evokes the temperature of the landscape whose image is captured in the photographic image.

15. The computer program product of claim 9, wherein said program instructions to augment the photographic image comprise:
   program instructions to augment the photographic image according to biometric sensor readings received from a biometric sensor associated with a viewer of the photographic image.

16. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
   program instructions to receive a photographic image that was captured by a camera;
   program instructions to determine a context of the photographic image, wherein the context is captured by a context sensor at a location of a subject whose image is captured in the photographic image, wherein the context describes a state of the subject whose image is captured in the photographic image, wherein the photographic image is from an album of photographs, and wherein the context of the photograph image is determined by:
      determining the context of the photographic image based on images shown in one or more other photographs from the album of photographs;
   program instructions to augment the photographic image with an additional feature to create an augmented photographic image based on the context captured by the context sensor; and
   program instructions to present the augmented photographic image on a viewing device.

17. The computer system of claim 16, wherein the context is a physiological state of a person whose image is captured in the photographic image, wherein the physiological state of the person is detected by a biometric sensor associated with the person, and wherein said program instructions to augment the photographic image comprise:
   program instructions to add a sound track to the photographic image, wherein the sound track evokes the physiological state of the person captured in the photographic image.

18. The computer system of claim 17, wherein the sound track is retrieved from a database of stored sound tracks that were not captured by the camera.

19. The computer system of claim 16, wherein the context is a physiological state of a person whose image is captured in the photographic image, wherein the physiological state of the person is detected by a user biometric sensor associated with the person, and wherein said program instructions to augment the photographic image comprise:
   program instructions to overlay a visual effect on the photographic image, wherein the visual effect evokes the physiological state of the person whose image is captured in the photographic image.

20. The computer system of claim 16, wherein the context is a temperature of a landscape whose image is captured in the photographic image, wherein the temperature is captured by a thermometer associated with the landscape, and wherein said program instructions to augment the photographic image comprise:
   program instructions to overlay a visual effect on the photographic image, wherein the visual effect evokes the temperature of the landscape whose image is captured in the photographic image.

* * * * *